Patented Dec. 5, 1933

1,938,557

UNITED STATES PATENT OFFICE

1,938,557

PROCESS FOR THE THERMIC PRODUCTION OF PHOSPHORUS FROM CRUDE PHOSPHATES

Stapleton D. Gooch, Lake Wales, Fla., and Friedrich P. Kerschbaum, Frankfort-on-the-Main, Germany, assignors, by mesne assignments, to Pembroke Chemical Corporation, Pembroke, Fla., a corporation of Florida No Drawing. Application June 2, 1930, Serial No. 459,015, and in Germany June 11, 1929

3 Claims. (Cl. 23—223)

This invention relates to the production of phosphorus and phosphorus oxids or acids from natural phosphorus-containing materials such as phosphate rock by a thermic process.

As is known, the thermic production of phosphorus and phosphorus oxids or acids from phosphates is based upon the chemical reaction represented by the following equation known as Wöhler's equation:

$$2Ca_3(PO_4)_2 + 6SiO_2 + 10C = 6CaSiO_3 + 10CO + 4P$$

According to this equation the phosphorus is liberated as elemental phosphorus which can be recovered as such or converted into phosphorus oxids by combustion and the latter recovered.

In carrying out this reaction industrially, electrically heated furnaces have hitherto been almost exclusively employed. Electrical heating is capable of uniformly providing the maximum temperature required for the reaction and consequently the process as carried out with electrical heating operates quite smoothly, but electrical heating has the disadvantage that electric power is comparatively expensive and usually is not available in sufficient amount in the vicinity of natural phosphate deposits.

These circumstances have given rise to a demand for a process which is not dependent upon electrical heating and as a result a number of processes generally involving the use of other types of furnaces, for example shaft furnaces, have been proposed. Up to the present time, however, none of these processes has been developed to the point of satisfactory commercial operation.

The process of the present invention has been proven to be capable of economical industrial operation. It operates smoothly and regularly and yields a high output compared with the equipment involved. It employs a shaft furnace of the blast furnace type, uses crude phosphates and coke as starting materials, and produces elemental phosphorus or phosphorus oxids or acids as desired.

The invention is based upon the observation that the phosphorus producing reaction referred to above is greatly facilitated both as to speed and completeness by the rinsing effect of a large quantity of rapidly moving gas whereby the gaseous products of the reaction, particularly the phosphorus vapor, are quickly diluted and carried out of the reaction zone. The removal of phosphorus from the reaction zone displaces the reaction equilibrium and causes the reaction to proceed rapidly to completion at a lower temperature than otherwise.

The following are regarded as being the principal essential conditions of the process:

(1) The rinsing of the reaction mixture must take place at a temperature which is high enough to permit the reaction to proceed;

(2) The reaction mass must be in the form of lumps of sufficient size to permit the flow of a large volume of gas therethrough and the lumps must be of such a character as to not disintegrate in the furnace.

The phosphatic material may be supplied to the process either in its naturally occurring lump form which may, of course, be crushed or broken and graded to the desired size, e. g. as hard, massive or lumpy phosphate rock, pebble phosphate, etc., or in the form of lumps produced by sintering more or less finely divided phosphatic material such as phosphate rock, together with added silica if required and coal or coke. The masses produced by sintering, if properly prepared, will contain the silica necessary for the reaction referred to above, and will be sufficiently hard and strong that they will not disintegrate in the furnace, and furthermore will be of a highly porous nature, which facilitates the rinsing effect above referred to.

The silica required for the reaction preferably is supplied in the form of gangue of the natural phosphate used and may be present in the charge in substantial excess. The carbon required for the reaction and for heating, aside from that used in the sinter above referred to, preferably is supplied in the form of lumpy metallurgical coke.

The lumps of phosphatic material and coke supplied to the furnace may vary considerably in size. Pieces of about from 2 to 6 cm. in diameter have been found to be particularly advantageous, but in a furnace of the size of a standard iron blast furnace, lumps more than 12 cm. in diameter have been used successfully. It is highly important for successful operation that the lumps of the charge shall not disintegrate or produce dust. Dust contaminates the phosphorus or oxid of phosphorus vapor produced while disintegration of the lumps impedes the blasting and thereby reduces the rinsing effect which is so important to successful operation and moreover retards the operation of the furnace and reduces the through-put which also is important in industrial operation. Both effects, i. e. dust formation and interference with the blasting of the charge, ordinarily result from disintegration of the lumps such as usually occurs in the use of briquettes. In operation of the furnace with a charge of lumpy phosphate which does not disintegrate, and lumpy coke, the charge is first preheated in the upper shaft of the furnace and then as it passes downwardly the lumps of phosphate slowly melt at the surfaces producing a reaction system with an extended surface which permits thorough contact with the rinsing gas. As will be apparent, it is desirable that the heating of the charge as it enters the reaction zone shall be sufficiently rapid that the lumps melt at the surface as the reaction proceeds.

The sintered phosphatic material may be produced, for example, by mixing natural phosphate material, such as Florida matrix, Morocco sand and the like, in particles of suitable and preferably of substantially uniform size, e. g. up to 5–10 mm. diameter, with silica or silicate, such as gangue, clay or the like, if the phosphatic material does not contain sufficient silica, and a small amount of coke, e. g. 6 to 10%, preferably in the form of dust of a particle size of say from 1 to 3 mm., and water, and heating the mixture to sintering temperature, for example in a Dwight-Lloyd sintering machine. The sinter is broken into lumps of the desired size, e. g. 2 to 10 cm. or more in diameter. Apparently due to the partial fusion which occurs during the sintering, the sintered product is capable of retaining its physical form even in a high shaft furnace and does not disintegrate noticeably or yield dust even in the reaction zone. Due apparently to the coarsely porous structure of the sinter it effectively retains the unavoidable coke dust in the upper part of the shaft, and promotes the uniform distribution and free flow of the blast. These factors as indicated above provide an effective rinsing of the gaseous reaction products, high operating temperature, rapid and complete reaction and a high through-put.

Due to the resistance of the sintered material to disintegration, it may be used in a furnace of the size and type commonly employed in iron blast furnace practice, in a charge made up of 3–2 parts of sinter to 1 part of coke and the furnace operated at a high blast speed or coke through-put corresponding to that commonly used in iron blast furnaces, e. g. a through-put of 200–800 kg. of coke per hour per square meter of hearth in a furnace having a hearth diameter of 2.5 meters, the term "through-put" being used to designate the rate at which the furnace is driven, this rate being conveniently defined in accordance with blast furnace practice in terms of coke consumption.

In operating with phosphate material in natural lump form it is generally advantageous to use a somewhat higher proportion of coke to phosphate in the charge than when using sinter as described above. The proportion of coke should be adjusted according to the character of the phosphatic material, but in general the ratio should be in the neighborhood of 1 part of coke to from 1.5 to 2 parts of phosphate material.

As compared with natural phosphate material in lump form, the sinter above referred to has the advantage that the through-put of phosphate generally is from 20% to 40% higher.

The process as described above is further improved by providing the phosphatic material with a coating of carbon or carbonaceous material. For instance, in the preparation of a sinter of phosphatic material, the hot sinter leaving the sintering furnace is quenched or irrigated with a mixture of coke dust in water or other suitable liquid vehicle. Due to the porous character of the sinter a considerable quantity of carbon in powdered or granular form can be added to it in this way without destroying the effectiveness of this porosity in promoting the reaction as described above. The quantity of coke dust added to the sinter should of course be limited so as not to destroy the effective porosity of the sinter and the quantity of water added as vehicle should be limited to the quantity which the hot sinter will evaporate. In place of water as the vehicle it may be advantageous to employ liquids containing organic or inorganic materials in solution or suspension, for instance, molasses, which may serve to cause the coke powder to adhere. With such a vehicle having adhesive properties natural unsintered phosphates in lump form also advantageously may be provided with a coating of carbonaceous material.

In the operation of the process it has been found to be advantageous to employ a furnace with a relatively high shaft, e. g. a furnace the height of the shaft of which is six to seven times its greatest diameter. By the use of such a high shaft it is possible to thoroughly preheat the charge in spite of the rapid through-put. In the high temperature zone of the furnace the walls are constructed of highly fireproof ceramic material and are suitably protected against attack by the slag by water cooling. The charging of the furnace advantageously is effected by alternately introducing layers of phosphate material and coke in quantities of say from one to several cubic meters. A mixture of phosphate material and coke may, however, be charged.

Due to the fact, as stated above, that the lumps of charged phosphate material gradually melt from the surface and the reaction occurs in the resulting extended films or layers of molten material, an almost quantitative extraction of the phosphorus is accomplished by the use of a relatively high shaft by the time the charged material becomes completely molten and falls into the sump of the furnace. It is very difficult to obtain any further phosphorus remaining from the molten mass of slag in the sump.

Another important feature of the process is the use of a highly heated blast. A blast which is more highly heated than is the blast in iron blast furnace practice preferably is employed, i. e. a blast heater to 700° C. or higher. The blast is introduced through suitable tuyères as in iron blast furnace practice.

The gases issuing from the top of the furnace, loaded with phosphorus vapor and at a temperature above the dew point of phosphorus, are conducted to suitable cooling and condensing means for the recovery of the phosphorus. The slag is tapped off as is customary in iron blast furnace practice.

It is possible to supply a portion of the heat required for the operation of the furnace by auxiliary heating, e. g. by the introduction of hot combustion gases at the base of the furnace, or by injecting fuel oil into the blast, or by the use of oil burners directed into the base of the furnace. In this way up to 20 or 30% of the normal coke supply to the furnace may be replaced by oil fuel and moreover the flow of gas through the charge and consequently the rinsing effect is increased.

By operating as described and observing the conditions of supplying the phosphate material in lumpy form, maintaining a sufficiently high temperature in the furnace, and providing for a thorough rinsing effect, it is possible to recover 90 to 95% of the phosphorus content of the phosphate material charged into the furnace and to produce a slag containing generally less than 3 or 4% of phosphorus pentoxide and practically free of carbon. As stated above, the phosphorus is liberated not from the slag in the sump but from the lumpy charge as it passes down the shaft of the furnace.

The rinsing effect of the gases upon the charge may be appreciated from the fact that when 1 ton of phosphate material containing 25% $P_2O_5$ is charged into the furnace with coke in the ratio of 2 to 1, 2500 cubic meters of gas measured under normal conditions and excluding the phosphorus vapor are produced.

It will be understood from the foregoing that the use of phosphate material in lumpy form, which does not disintegrate in the furnace, contributes the following essential effects: It prevents dust formation, permits a rapid flow of gas and consequently a thorough and rapid preheating of the charge, a highly efficient rinsing effect, rapid and complete reaction and high through-put. The high through-put of the process is an important consideration from an industrial standpoint and it is noted moreover that the coke consumption is well within economical limits.

It will be appreciated that the rinsing effect provided in our process gives effects which are similar to or take the place of the effects heretofore obtained by the use of briquettes of finely divided phosphate material and carbonaceous material, and electrical heating. That is, the rinsing effect provides the necessary intimate contact of the reacting materials and eliminates the necessity for the extremely high temperatures obtainable only in an electric furnace or for protracted treatment.

As has been indicated, the invention provides a technically and economically satisfactory process of making phosphorus and phosphorus oxids. It eliminates the use of electrical power with its attendant disadvantages such as transportation of the crude phosphate material, high power cost and small operating units. The process of the invention preferably employs units of large size and large out-put and operates with an ordinary air blast without oxygen enrichment, although oxygen-enriched blast may be used if desired.

We claim:—

1. A thermic process for the production of phosphorus which comprises supplying a shaft furnace with a charge comprising a silica-containing phosphate material in the form of lumps which will not disintegrate in passing through the shaft of the furnace and lumps of coke, the proportion of coke to phosphate material being about 1 part of coke to from 1.5 to 3 parts of phosphate material, blasting the charge with air preheated to at least 700° C., the throughput of the furnace based on coke consumption being maintained at from 200 kg. to 800 kg. per hour per square meter of hearth.

2. A thermic process for the production of phosphorus which comprises supplying a shaft furnace of the blast furnace type with a charge comprising a silica-containing phosphate material and coke both in the form of lumps which do not disintegrate in passing through the furnace, maintaining a column of charge in said shaft the height of which is at least about six times its greatest diameter, blasting the charge with air preheated to at least about 700° C., and maintaining a through-put calculated on coke consumption of from 200 kg. to 800 kg. per hour per square meter of hearth.

3. A thermic process for the production of phosphorus which comprises supplying a shaft furnace of the blast furnace type with a charge comprising a sintered silica-containing phosphate material and coke both in the form of lumps which will not disintegrate in passage through the shaft of the furnace, maintaining a column of said charge having a height of at least about six times its greatest diameter, blasting the charge with air preheated to at least about 700° C. at such a rate as to maintain a through-put calculated on coke consumption of about from 200 kg. to 800 kg. per square meter of hearth.

STAPLETON D. GOOCH.
FRIEDRICH P. KERSCHBAUM.